US 12,413,590 B2

United States Patent
Pittner et al.

(10) Patent No.: US 12,413,590 B2
(45) Date of Patent: Sep. 9, 2025

(54) SMART CLIENT FOR DEPLOYMENT ARCHITECTURE WITH UNRELIABLE NETWORK CONNECTION

(71) Applicant: International Business Machines Corporation, Armonk, NY (US)

(72) Inventors: Daniel Pittner, Esslingen am Neckar (DE); Martin Smolny, Boeblingen (DE); Christian Habermann, Boeblingen (DE); Silke Wastl, Sindelfingen (DE); Michael Haide, Jettingen (DE)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/652,302

(22) Filed: Feb. 24, 2022

(65) Prior Publication Data

US 2023/0269253 A1    Aug. 24, 2023

(51) Int. Cl.
*H04L 9/40* (2022.01)
*H04L 41/0654* (2022.01)

(52) U.S. Cl.
CPC ........ *H04L 63/102* (2013.01); *H04L 41/0654* (2013.01); *H04L 63/126* (2013.01); *H04L 63/1458* (2013.01)

(58) Field of Classification Search
CPC . H04L 63/102; H04L 41/0654; H04L 63/126; H04L 63/1458; H04L 67/535; H04L 67/34; H04L 63/08; H04L 67/133

(Continued)

(56) References Cited

U.S. PATENT DOCUMENTS 6,175,869 B1 *  1/2001  Ahuja ................ H04L 67/1019
                                                     718/105
9,325,785 B2 *  4/2016  Kohn ................. H04L 67/1029
(Continued)

FOREIGN PATENT DOCUMENTS

EP          2757757 A1     7/2014
WO      2023/161175 A1     8/2023

OTHER PUBLICATIONS

IntegriScreen: Visually Supervising Remote User Interactions on Compromised Clients, Sluganovic et al., Nov. 2020 (Year: 2020).*

(Continued)

*Primary Examiner* — Jahangir Kabir
(74) *Attorney, Agent, or Firm* — Aaron N. Pontikos

(57) ABSTRACT

Embodiments of the present invention provide computer-implemented methods, computer program products and computer systems for enabling modifying a behavior of a consuming component. The method comprises requesting a smart client by a consuming component. The smart client is adapted to modify a control logic of the consuming component and to establish a network connection. Next, the consuming component executes the smart client and receives a modification for the smart client of the consuming component. Further, a computer-implemented method for enabling modifying a behavior of a consuming component by a serving component is disclosed. This method comprises, upon receiving a request for a smart client by the serving component, providing a smart client, transmitting the smart client, receiving service requests comprising procedure calls to be executed by the serving component, and, upon detecting a performance change by the serving component, sending a modification for the smart client.

13 Claims, 8 Drawing Sheets

(58) Field of Classification Search
USPC .......................................................... 726/6
See application file for complete search history.

(56) References Cited

U.S. PATENT DOCUMENTS

| | | | |
|---|---|---|---|
| 2008/0271019 A1* | 10/2008 | Stratton | G06F 21/577 |
| | | | 718/1 |
| 2010/0094592 A1* | 4/2010 | Cherkasova | G06F 11/3466 |
| | | | 703/2 |
| 2014/0101236 A1 | 4/2014 | Dietrich | |
| 2015/0236977 A1* | 8/2015 | Terayama | H04L 47/762 |
| | | | 709/224 |
| 2016/0072847 A1 | 3/2016 | Bremen | |
| 2021/0099482 A1 | 4/2021 | Doron | |

OTHER PUBLICATIONS

"Preventing DoS Attacks on Applications", AskF5, © 2021 F5, Inc., 20 pages, <https://techdocs.f5.com/en-us/bigip-14-1-0/big-ip-asm-implementations-14-1-0/preventing-dos-attacks-on-applications.html>.
Rawdat, Amir, "Rate Limiting with NGINX and NGINX Plus", Jun. 12, 2017, 15 pages, <https://www.nginx.com/blog/rate-limiting-nginx/>.
Mell et al., "The NIST Definition of Cloud Computing", Recommendations of the National Institute of Standards and Technology, NIST Special Publication 800-145, Sep. 2011, 7 pages.
Hill et al., "Smart Client Architecture and Design Guide", Microsoft, 2004, 212 pages.
International Search Report and Written Opinion, International Application No. PCT/EP2023/054156, International Filing Date Feb. 20, 2023, 15 pages.

* cited by examiner

SMART CLIENT FOR DEPLOYMENT ARCHITECTURE WITH UNRELIABLE NETWORK CONNECTION

BACKGROUND

The present invention relates in general to consuming components, and more specifically to modifying behavior of a consuming component.

Cloud computing is a given in today's enterprise computing landscape. Central computing or storage service are provided to a plurality of client devices. An identity access management may only be one example. In such architecture, the clients may send their requests regardless of the status of the server, even if the server may be in an overload status.

There are many applications that are heavily relying on a client-server architecture, wherein their components can all be deployed within one or multiple datacenter. However, some components of the applications may be running on consumer computers or mobile devices and may be controlled by different entities. One danger to the reliability of the application is that the network connection between the client and the server must be unreliable. For example, the connection can be interrupted completely or the bandwidth and/or latency may vary significantly. Another threat may relate to large fluctuations of the load on the server component(s), where the load is often caused by one or more client component(s).

Traditional solutions to the problems noted above may include rate limiting, load balancing, or high availability deployments for server components that might not experience the problems. For example, a conventional system for mediating internet service can receive requests from a client are selectively redirected to a proxy server for mediation. This may provide some relieve to the server. Another conventional system can provide some protection against denial-of-service, DoS, attacks performed over quick user data protocol connections. With this system, if an attack is detected, the detection of an attack, a mitigation action, such as, a rate limit, may be initiated.

There are other strategies to protect a server from overload, such as rate limitation based on IP addresses (IP=internet protocol) or authentication tokens or horizontal or vertical scaling. There are also additional strategies to prevent the entire application from showing performance or functionality losses if one or more server components can no longer be reached due to network problems or may only be reached with reduced bandwidth or latency. Load balancing and high availability concepts may be used for this utilized. However, these strategies rely on static rules, which can only be changed by the entity that controls the components. Since the consuming component is often controlled by a different entity, the way to react to threats remains static—even though each individual component could react on variations in network and load on its own.

Therefore, there is a demand for more effective methods to improve a resilience behavior of the whole system.

SUMMARY

According to one aspect of the present invention, a computer-implemented method for enabling modifying a behavior of a consuming component may be provided. The method may comprise requesting a smart client by a consuming component, wherein the smart client is adapted to modify a control logic of the consuming component, wherein the smart client is enabled to establish a network connection, executing the smart client by the consuming component, requesting services by the consuming component, and receiving a modification for the smart client of the consuming component.

According to another aspect of the present invention, a computer-implemented method for enabling modifying a behavior of a consuming component by a serving component is provided. The method may comprise: upon receiving a request for a smart client by the serving component, providing a smart client and transmitting the smart client, receiving service requests comprising procedure calls to be executed by the serving component, and, upon detecting a performance change by the serving component, sending a modification for the smart client.

According to a further aspect of the present invention, a consuming component system for enabling modifying a behavior of a consuming component by a serving component may be provided. The consuming component system may comprise: a processor and a memory, communicatively coupled to the processor, wherein the memory stores program code portions that, when executed, enable the processor to request a smart client by a consuming component, wherein the smart client is adapted to modify a control logic of the consuming component, wherein the smart client is enabled to establish a network connection. The processor is also enabled to execute the smart client in the consuming component, to request services by the consuming component, and to receive a modification for the smart client of the consuming component.

According to yet another aspect of the present invention, a serving component system for enabling modifying a behavior of a consuming component by a serving component may be provided. The serving component system may comprise a processor and a memory, communicatively coupled to the processor, wherein the memory stores program code portions that, when executed, enable the processor, upon receiving a request for a smart client by the serving component to provide a smart client, and to transmit the smart client, to receive service requests comprising procedure calls to be executed by the serving component, and, upon detecting a performance change by the serving component, to send a modification for the smart client.

The proposed computer-implemented method for enabling modifying a behavior of a consuming component and the proposed computer-implemented method for enabling modifying a behavior of a consuming component by a serving component may offer multiple advantages, technical effects, contributions and/or improvements:

An application architecture including the serving component and/or the consuming components may not be static anymore and can easily be adapted to new or modified threats. For example, the serving component may dynamically modify the smart client. Therewith, the behavior of the whole architecture will be adapted to a changing situation. In contrast to the conventional systems, the serving component can change the behavior of the consuming components—simply through changing a program code on the consuming component(s). This may be done iteratively to provide an enhanced resilience with respect to a constantly changing threat situation. Furthermore, even though the consuming component may be controlled by a different entity than the serving component, updates (e.g., new client libraries) can be enforced on the side of the consuming component through the smart client. In this way, the serving component may achieve some control over the consuming component (e.g., to enforce updates such as modifications to the client libraries). So, the rules for responding to threats can become dynamically in order to enable reactions.

In the following, additional embodiments of the inventive concept—applicable for the methods as well as for the systems—will be described.

According to one preferred embodiment of the method, the modification for the smart client may enable at least one activity selected out of the group comprising: controlling application performance of the consuming component, controlling a connection bandwidth of the consuming component, controlling a cache invalidation of the consuming component, enforcing a selective or a non-selective caching of the consuming component, enforcing a connection request rate limitation of the consuming component, disabling a cache coherence of the consuming component, implementing a preselected coherence protocol for the consuming component, enabling a defense against a distributed denial of service attack, reducing a rate for sending requests from the consuming component. These activities provide at least one common advantage, namely, to protect the serving component from overload—in other words, to manage load balancing by, e.g., load shedding of currently unnecessary computing load.

In particular, the cache coherence of the consuming component may be disabled between a cache of the consuming component and a corresponding serving component. The defense against a distributed denial of service, DDoS, attack may be implemented by stopping one or more selected smart clients to prevent overloading the server with too many client requests. For example, too many IAM (identity and access management) service requests per time slot from the one or more clients may lead to an overload of the serving component and thus, to a breakdown of the server. The rate for sending requests from the consuming component may be reduced from the consuming component to the serving component to block too much traffic from predefined clients. The blocking can also be cancelled out, i.e., the traffic from the consuming device to the serving device may be "switched on again" or re-enabled by another modification sent from the serving component to the client component. The updating of the name service table of the consuming component may include (pre-)allowing only pre-selected IP (Internet Protocol) addresses, or requests may be sent to other servers. This may enable the advantage of server-side load shedding.

According to one optional embodiment, the method may also comprise a tagging a procedure call—e.g., to the serving component—of the consuming component, controlled by the smart client, by a smart client fingerprint. For example, the fingerprint may be a hash value of the smart client version so that the serving component may (uniquely) identify the individual smart client. But it may also be another tag that may allow the identification of the consuming component. This may provide the advantage that the identification may be used to identify a source of a degradation (e.g., of the network) so that targeted measures may be activated to overcome the degradation (e.g., an update to the smart client of a potentially malicious consuming component can be enforced).

According to one advantageous embodiment, the method may further comprise executing or instantiating the smart client in a sandbox runtime environment of the consuming component. The smart client may also be executed in any other environment of restricted permissions. This may provide the advantage that the serving component cannot install any computer code on or in the consuming component. The consuming component may thus keep control over the permission level of the smart client.

According to one additional embodiment, the method may comprise sending, by the smart client, operational parameter values of the consuming component. The operational parameter may be receivable by the serving component and may indicate, e.g., a network performance, a cache status, an exceptional situation or other unusual situations. This may offer the advantage that the serving component may get access to information which is merely obtainable by the consuming components (e.g., an "outside look" on the situation).

According to one further embodiment, the method may comprise validating, by the consuming component, the received smart client or the received modification to ensure authenticity. For this, a signature, a hash value, or other cryptographic measures of the consuming component such as using TLS (transport layer security) may be used. Thus, the consuming component can be sure that only authorized smart client may become active on the side of the consuming component.

Further advantageous embodiments refer to the computer-implemented method for enabling modifying a behavior of a consuming component by a serving component (i.e., server-side method).

For example, according to one optional embodiment, in the server-side method, a characteristic, in particular, a function, a control logic, etc., of the provided smart client may depend on a type of the request to the smart client—i.e., received from the consuming component—a source identifier of the request, an authentication of the request such as a fingerprint, a signature, a hash value, etc. and/or an identity of the request (e.g. all from the consumer component). Hence, different smart clients may be prepared and sent to different clients by the server component. This may depend on capabilities and/or functional restrictions of the consuming device. A smart client with more configuration options may get a more feature-rich smart client, whereas an IoT device (Internet-Of-Things) with very limited functions and memory capacities may be provided a very thin smart client.

According to one advantageous embodiment of the server-side method, the modification for the smart client may enable at least one selected out of the group comprising: controlling an application performance, controlling a connection bandwidth, controlling a cache invalidation, enforcing a selective or a non-selective caching, enforcing a connection request rate limitation, disabling a cache coherence between a cache of the consuming component and a corresponding serving component. All of these limitations may relate to the consuming component controlled by the smart client. And there may be more, the smart client may control: implementing a preselected coherence protocol, enabling a defense against a distributed denial of service because traffic from selected clients can be suppressed or slowed down, reducing a rate for sending requests from the consuming component to the serving component, updating a name service table, e.g., of the consuming component with (pre-)allowed IP addresses and requests that may be sent to other servers. All these actions may as a single measure or in selected combinations provide the advantage of a load shedding on the server-side. When the overload situation on the serving component side is over, the measure may be reversed in that the serving component may sent a further modification or a command that enables the modification to the smart client on selected consuming components.

According to one optional embodiment, the server-side method may comprise: upon receiving an operational parameter value—in particular, by the serving component—indicative of a network performance and/or a load status of the serving component, adapting the modification of the updated smart client before sending it. Therefore, the characteristic of the smart client may be managed according to a potential overload situation on the side of the serving component or on the network.

According to one advantageous embodiment of the server-side method, providing the smart client may comprise at least one selected out of the group comprising: generating the customized smart client, modifying the customized smart client, selecting the customized smart client from a group of smart clients. For example, the smart client may be specific for a particular consuming component or a subset of consumer components. However, according to further embodiments, all consumer components may be provided with the same smart client. This may define a default setting for the interaction between the serving component and the consuming component. These default settings may be updated over time and depending on the specific behavior of the consuming component and/or depending on the overall situation (e.g., the general network load). According to further embodiments, it may also be enforced that at least one smart client may be installed on the consuming component in order to access the serving component. This may provide the advantage that the serving component may react much earlier it may come to a partial or complete breakdown of the serving component.

According to a further optional embodiment, the server-side method may further comprise: upon detecting a temporary network fault or network deterioration, providing the update for the smart client. The term "fault" does not need to be a complete breakdown of the network but may relate to any deterioration implying that the network is not fully operational. For example, the network communication may, e.g., show interruptions, certain ports may not be available, an available bandwidth is only a fraction of the expected value, or there may be adverse effects. Depending on the specific error, the serving component may therefore have to wait until communication with the consuming client—or vice versa—may be possible to process the update. The update may include, inter alia, allowing a longer cache time for data in the consuming component instead of an immediate synchronization of caches of the consuming component and the serving component.

According to one optional embodiment, the server-side method may further comprise predicting a service request and proactively inserting cached data into a consuming application, or the respective smart client, during times of lower than average service request volumes received. The step of predicting may comprise a utilization of a suitable artificial intelligence technique. This may comprise a related learning period during which the system may constantly monitor the activities and learn from the consequences of various events.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
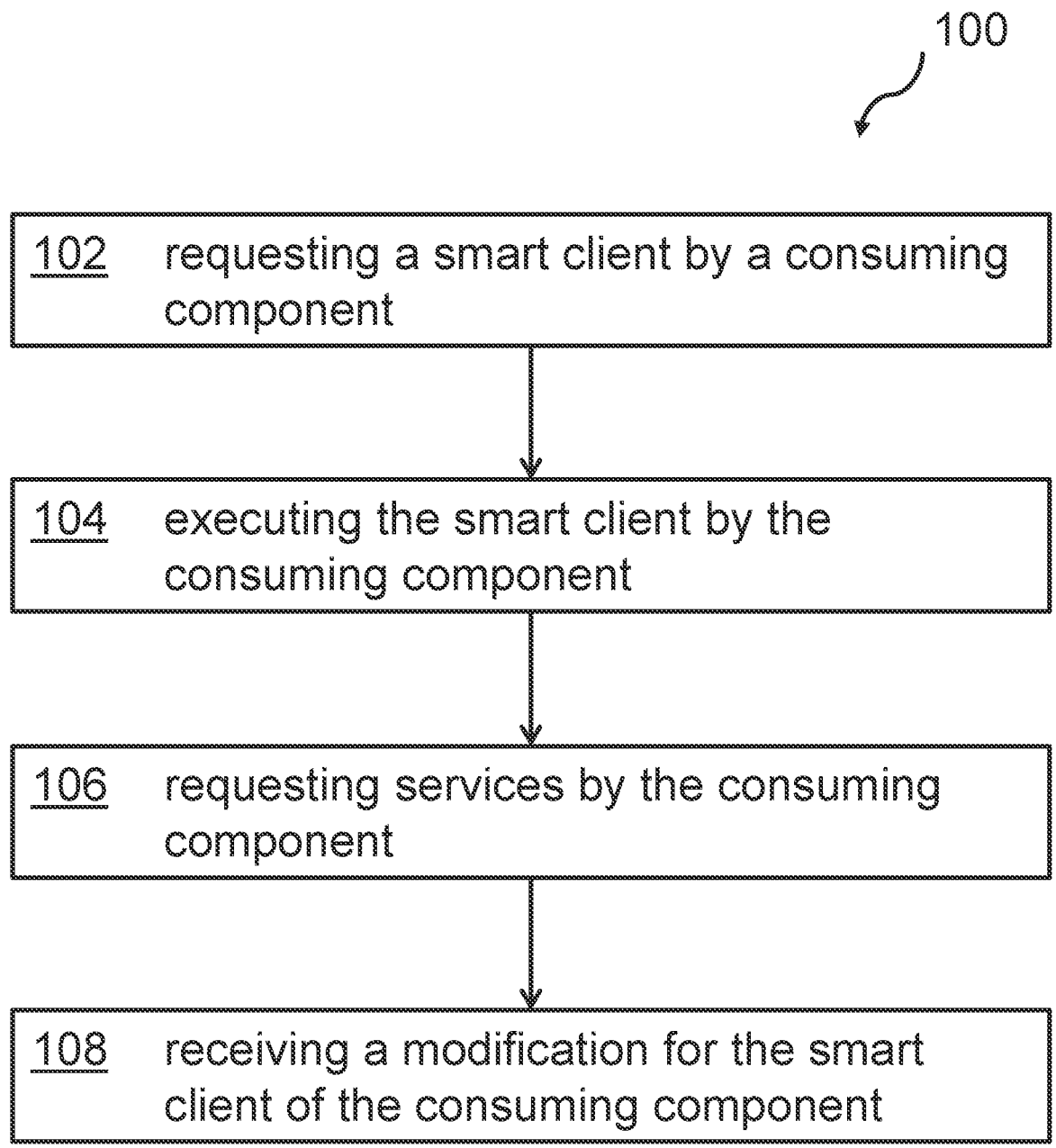

Preferred embodiments of the invention will be described, by way of example only, and with reference to the following drawings:

FIG. 1 shows a block diagram of an embodiment of the inventive computer-implemented method for enabling modifying a behavior of a consuming component.

Figure 2:
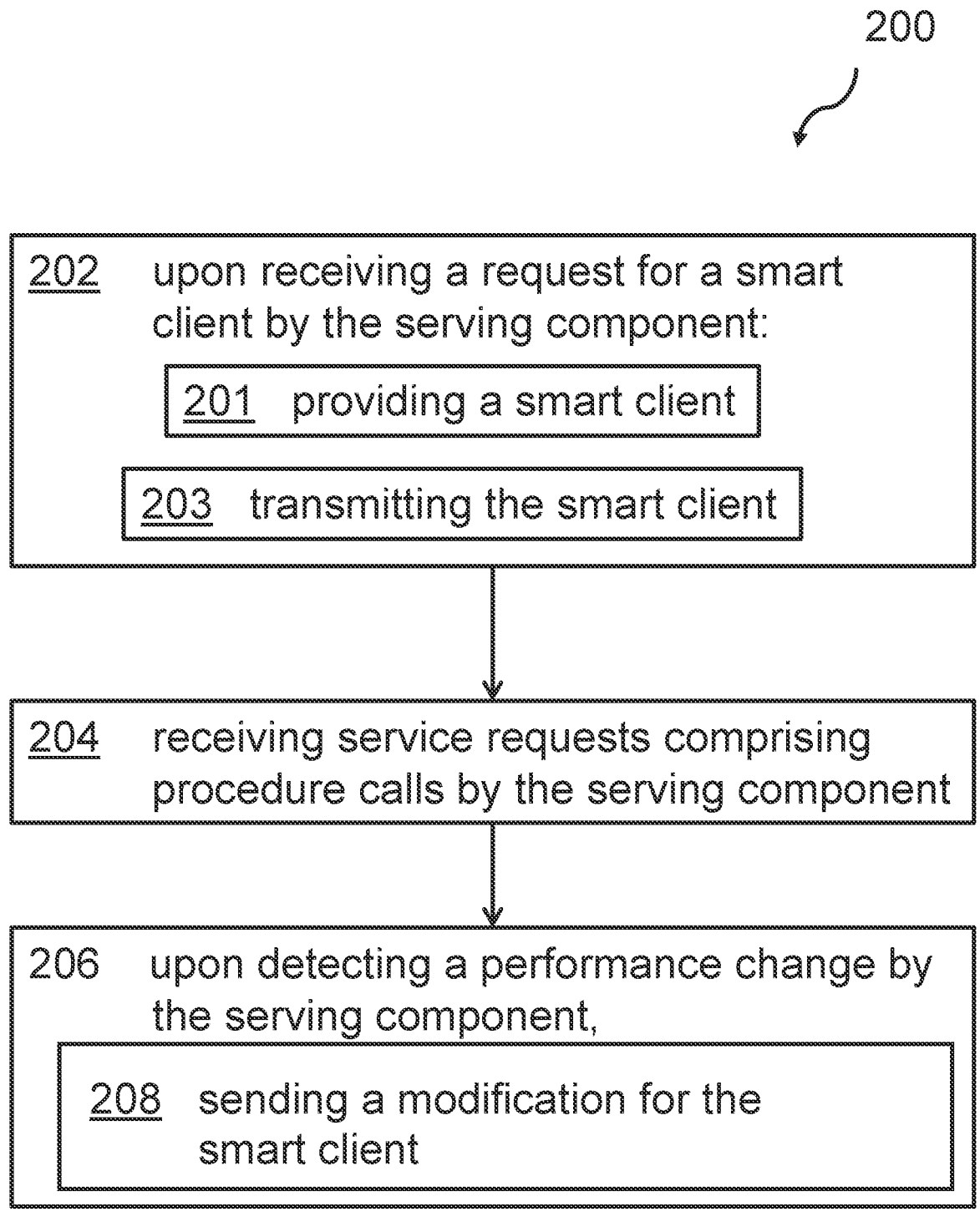

FIG. 2 shows a block diagram of an embodiment of the computer-implemented method for enabling modifying a behavior of a consuming component by a serving component.

Figure 3:
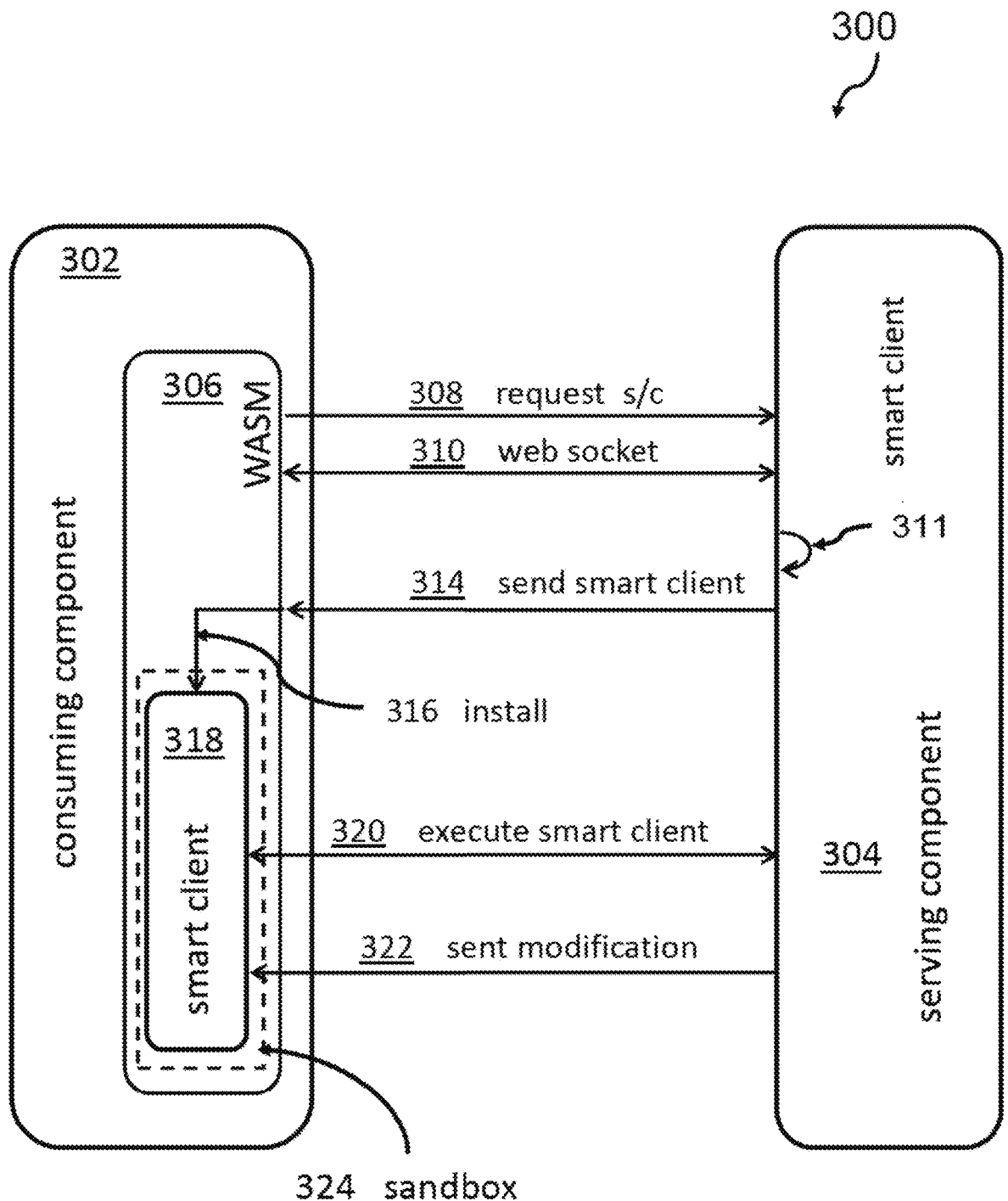

FIG. 3 shows a block diagram of interactions between the consuming component and the serving component.

Figure 4:
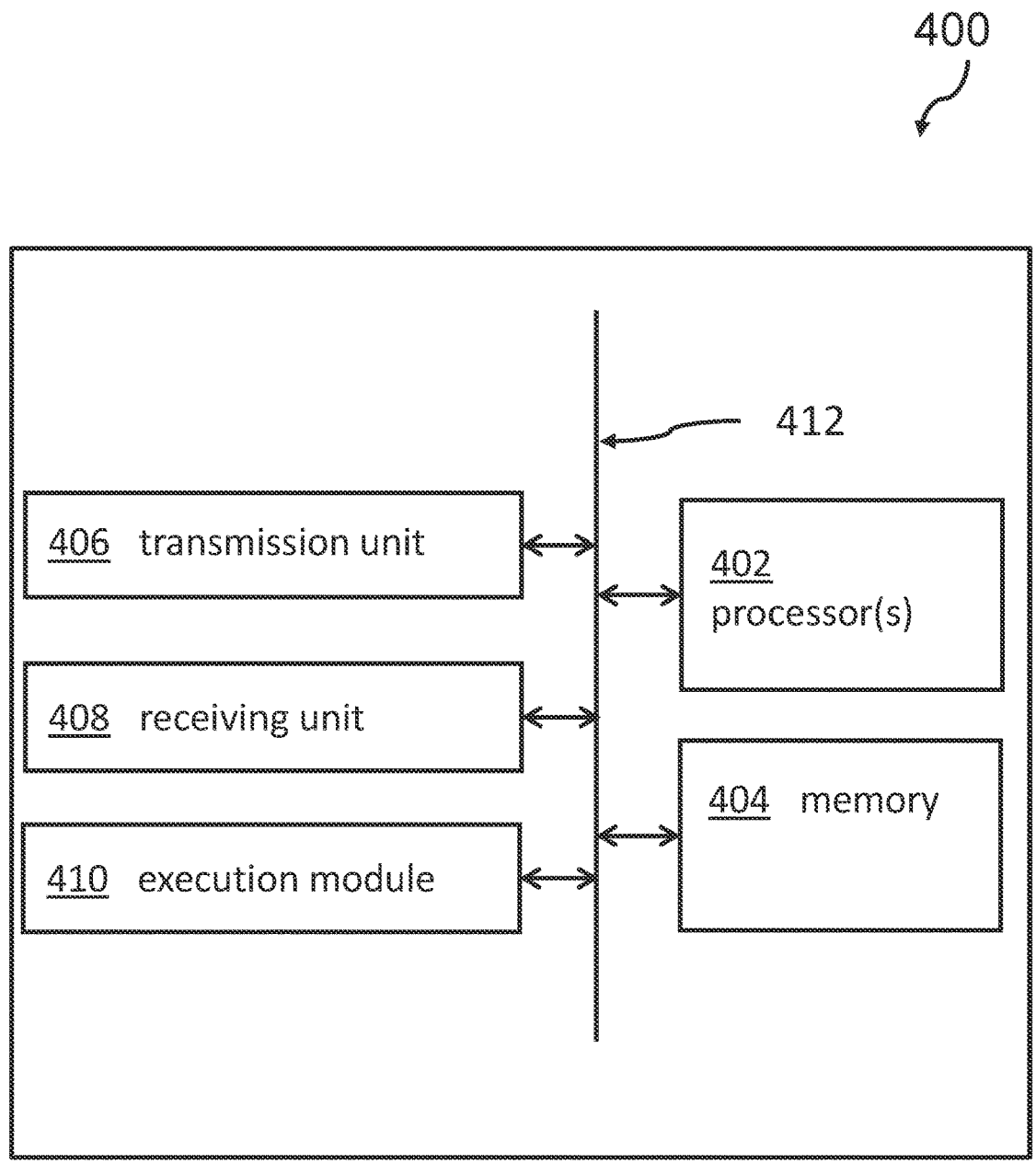

FIG. 4 shows a block diagram of an embodiment of the inventive consuming component system for enabling modifying a behavior of a consuming component by a serving component.

Figure 5:
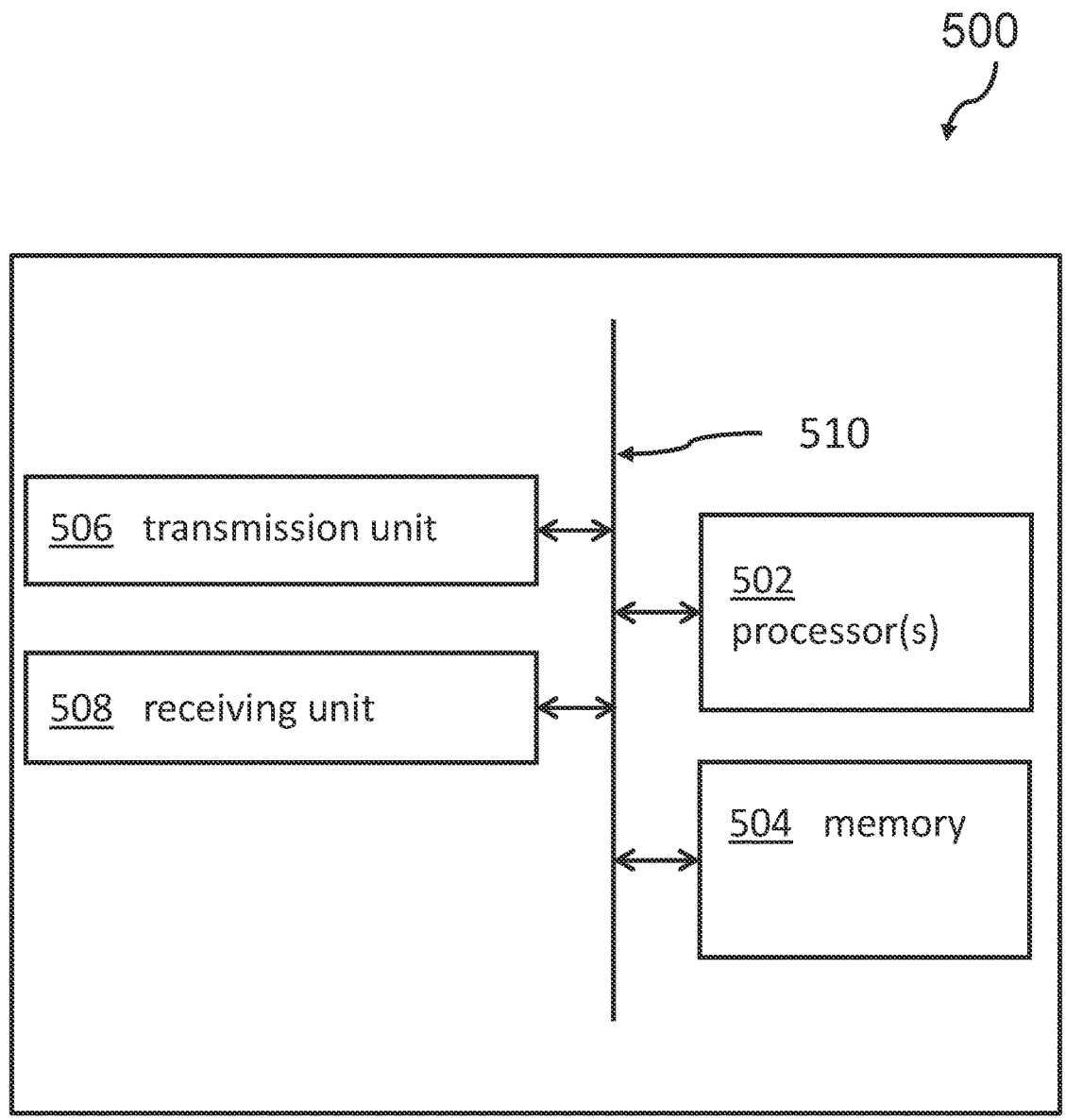

FIG. 5 shows a block diagram of an embodiment of the inventive serving component system for enabling modifying a behavior of a consuming component by a serving component.

Figure 6:
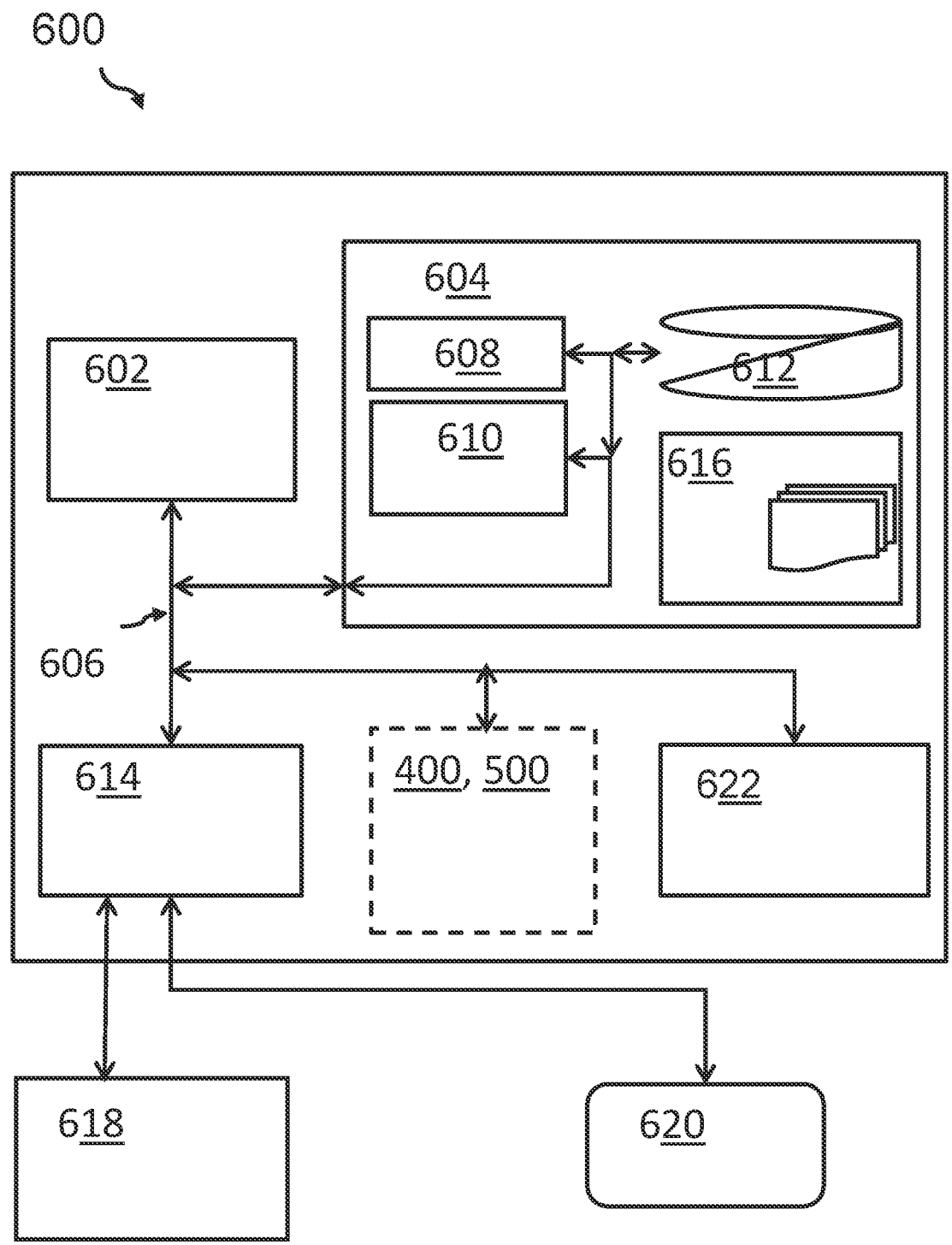

FIG. 6 shows an embodiment of a computing system comprising the system according to FIG. 4 or FIG. 5.

Figure 7:
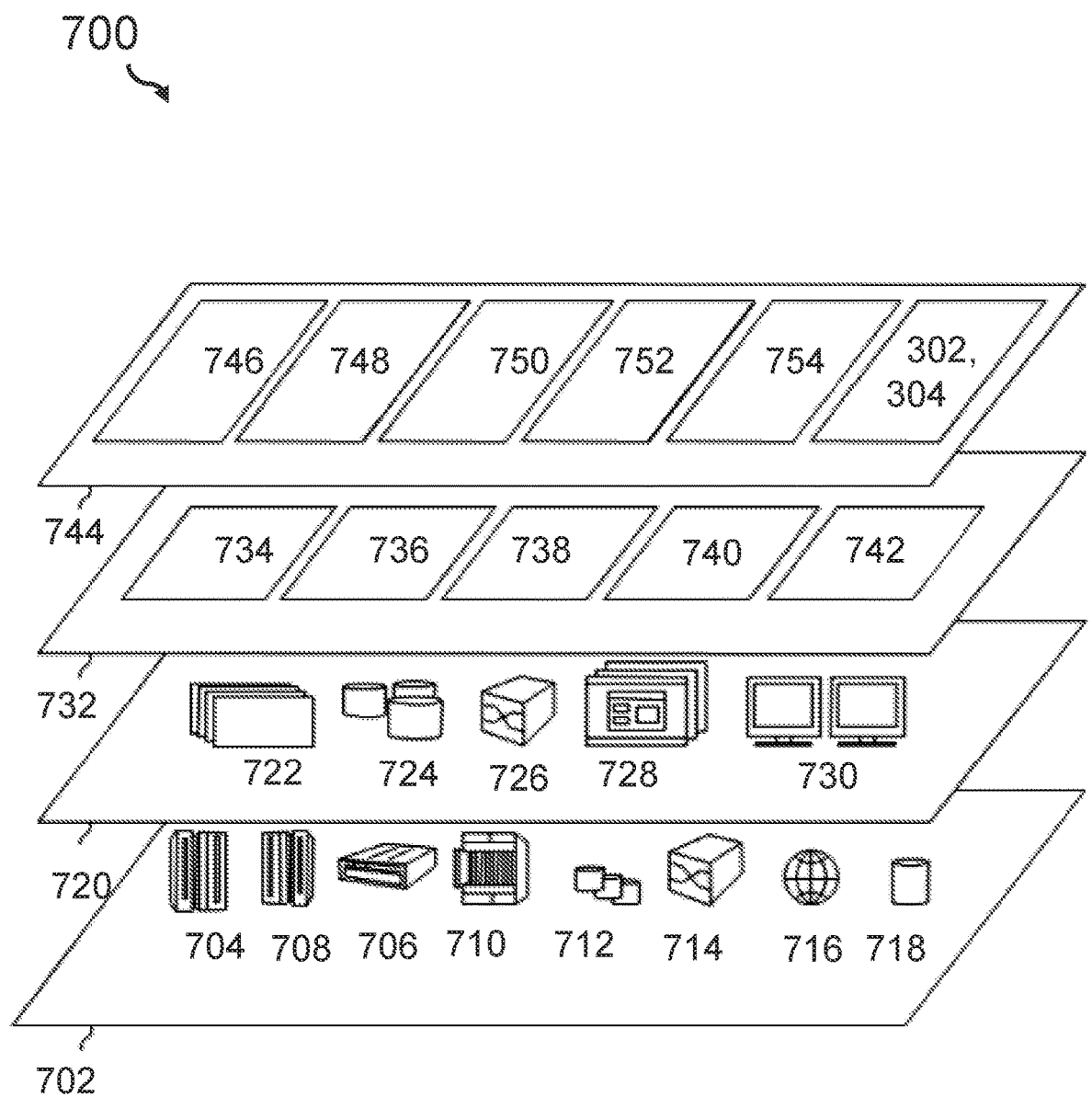

FIG. 7 shows a cloud computing environment in which at least parts of the inventive concept may be deployed.

Figure 8:
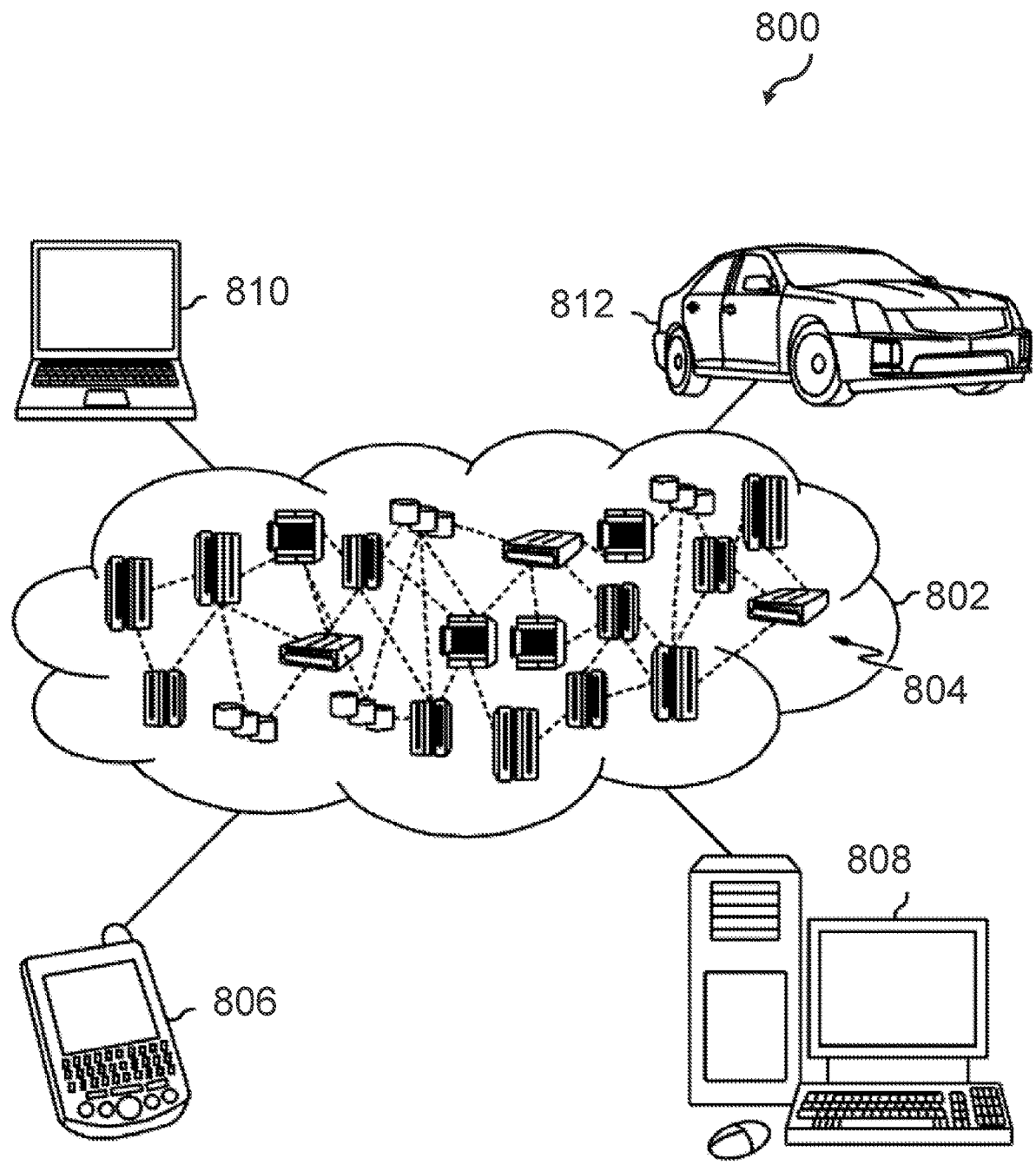

FIG. 8 shows components of a cloud computing environment.

DETAILED DESCRIPTION

Embodiments of the present invention recognize that applications are heavily relying on client server architectures. The components of these architectures can all be deployed within one or multiple datacenters or some components of the application can even be running on consumer computers or mobile devices. The various components of these applications are controlled by different entities. One thread to the reliability of the application is that the network connection between consuming and serving components may be unreliable. The connection can be interrupted completely, or it can show large variations in bandwidth and latency. Another thread is that the load on the serving components can vary largely and that the load is controlled by the consuming components.

Embodiments of the present invention recognize that current solutions do not allow that the server components change the behavior of clients. There are multiple strategies to protect the server from overload like rate limiting based on IP address or authentication tokens or horizontal or vertical scaling. Currently, there are also strategies to prevent the whole application from showing reduced performance or functionality if one or more serving components can no longer be reached or only be reached with reduced bandwidth or latency due to network problems, like load balancing and high availability concepts.

Accordingly, embodiments of the present invention recognize that currently, there is no way for the serving components to change the behavior of the consuming components, through changing the program code on the consuming components. Since the consuming components are controlled by a different entity even if updates are available (e.g., new client libraries), there is no way to force or control the consumer to install the updated client libraries. Thus, even though each individual component can react on variations in network and load, these reactions are based on static rules that can only be changed by the entity that controls the component. Accordingly, the resiliency behavior of the whole system remains static and can only slowly adopt to new threads.

Embodiments of the present invention provides solution to make these systems dynamic, that is, embodiments of the present invention allows the serving components to alter the behavior of the consuming components. To achieve this the consuming components are interacting with the serving components through a smart client that needs to be downloaded. This smart client creates a connection to the serving component and allows the consuming component to send requests to the serving component. At the same time, the serving component is able to initiate an update of the smart client at any time.

For example, there are various characteristics in the behavior of the smart client on the consuming components that can be dynamically changed by embodiments of the present invention. In DDos defense, the serving component tells the consuming component to block traffic from specific block listed third parties, while allowing traffic from the consuming components for all other third party requests (e.g., IAM PEP endpoint is able to block request from a third party on one or more consuming components that are getting requests form the third party). In another example concerning DNS outage, the serving component updates local DNS table on the consuming component with correct IP address (network disruption situations). In another example regarding, caching strategy/cache invalidation/disable cache coherence, the serving component controls the caching behavior within the smart client. The smart client can then send metrics to serving components, about the consumer side view of the current situation. In load shedding, the serving component can control load shedding on the consuming component.

In the context of this description, the following conventions, terms and/or expressions may be used:

The term 'serving component' may denote any device or software-implemented module that receives requests from other components and may be able to provide some service to dedicated or to all requesting parties. In particular, it may be a server implemented on a dedicated computing device. But it may also be realized as component within an ordinary computing device. It is primarily defined by its function of providing a service, not by its computational resources.

The term 'consuming component' may denote a device or a software implemented module that may send requests to other components. The consuming component may request a service, e.g., from a serving component. In particular, it may be a client that may interact with a server in a—client/server architecture. But it may also be realized as component within any other computing device. It is primarily defined by its function of "consuming" a service, not by its computational resources.

The term 'smart client' may be a program that can be downloaded from the serving component and that implements strategies or a policy to possibly optimize an application or device function or performance. Thus, the smart client may include or be logic implemented by software that can be installed or instantiated on a computing devise such as the consuming component. The smart client may be configured in such a way that it receives instructions from a serving component—in particular, a remote component—in order to bring out a change in the processes, the software behavior or the device characteristic within the consuming component.

The term 'behavior of a consuming component' may denote a characteristic of the consuming component or underlying device. Consequently, a 'change of the behavior' may denote any change or modification in hardware or software functionalities of the consuming component. The behavior may, in particular, refer to the way of interacting with other devices, e.g., to transmission of requests, use of network resources, using caches, sharing its cache with other applications, etc.

The term 'a control logic' may refer to any part of a software that may be able to control operations of a program, e.g., being executed on/in the consuming device. Additionally, the control logic may also influence the functions and capabilities of the underlying hardware. For example, the control logic may be able to respond to commands from a user. It may also act on its own to perform automated tasks that are controlled by the program.

The term 'service' may denote a function that may be perform, e.g., at the request of a third component. In the contexts of software architecture, service-orientation and service-oriented architecture, the term service may refer to a software functionality or a set of software functionalities (such as the retrieval of specified information or the execution of a set of operations) with the purpose of refusing different clients for different purposes, together with the policies intended to control its use (based on the identity of the client requesting the service, for example). In this context, OASIS defines a service as "a mechanism to enable access to one or more capabilities, with access provided using a prescribed interface and exercised in accordance with constraints and policies as specified by the service description".

The term 'modification for the smart client' may denote any change in the logic and function of the smart client that modifies its behavior in relation to its host (e.g., the consuming component). In particular, the modification in the smart client may result in a modification of the functioning of the consuming component with which it interacts with other components. Modifications for the smart client may thus be indirect modifications of the consuming component (i.e., indirect through the smart client).

The term 'sandbox runtime environment' may denote the sandbox in an isolated computing environment, e.g., within the consuming component that may be able to execute program code in an isolated environment. There is no risk influencing components outside the sandbox, unless explicitly specified, e.g., allowing network traffic pass to and from the consuming component. A web assembly runtime (WASM) is an example for such an environment. However, other runtime environments are conceivable.

The term 'WebAssembly' (WASM) may denote the know open standard that defines a portable binary-code format for executable programs, and a corresponding text format, as well as interfaces for facilitating interactions between such programs and their host environment. The main goal of WebAssembly is to enable high-performance applications on web pages, but the format is designed to be executed and integrated in other environments as well, including stand-alone ones.

The term 'smart client instance fingerprint' may denote a unique identification (fingerprint) suitable to identify remote procedure calls from the smart client.

The term 'cloud computing'—and equivalently the more specific term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise:

On-demand self-service: A consumer can unilaterally provision computing capabilities, such as server time and network storage, when needed automatically without requiring human interaction with each service provider.

Broad network access: Capabilities are available over the network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service: Cloud systems automatically control and optimize resource used by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing use comprise:

Cloud Software as a Service (SaaS): The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly application hosting environment configurations.

Cloud Infrastructure as a Service (IaaS):The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

Private cloud: The cloud infrastructure is operated solely by an organization. It may be managed by the organization or a third party and may exist on premise or off premise.

Community cloud: The cloud infrastructure is shared by several organizations and supports a specific community that has shared concerns (e.g., mission, security requirements, policy, and compliance considerations). It may be managed by the organizations or a third party and may exist on premise or off premise.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive computer-implemented method for enabling modifying a behavior of a consuming component—in particular by a serving component is given from the perspective of the consuming component. Thereafter, a block diagram of an embodiment of the inventive computer-implemented method from the perspective of the serving component is provided. Afterwards, further embodiments of the consuming component system as well as for the serving component for enabling modifying a behavior of a consuming component by the serving component are provided.

FIG. 1 shows a block diagram of a preferred embodiment of the computer-implemented method 100 for enabling modifying a behavior of a consuming component. The consuming component can be seen as client component and the serving component can be a backend server, cloud computing server, etc. At least one server and one or more clients are typically be connected by a network to define an exemplary application architecture, e.g., a client/server architecture. This method defines the inventive concept when viewed from the client (consuming component) only.

The method comprises, requesting, 102, a smart client by a consuming component, wherein the smart client is adapted to modify a control logic of the consuming component and is enabled to establish a network connection. The smart client may be a service running on the client to control, for example, network connections from the client to the server and vice versa. The smart client may be requested generally from anywhere, not only the serving component, and may provide services to the consuming component (i.e., a service consumer). The consuming component can be part of a hardware client (e.g., IAM requestor). The modification of the control logic of the consuming component may be implemented by changes in values in control variables or by replacing the smart client. Once the smart client is provided to the consuming component, the smart client is installed, e.g., in a sandbox or another save execution environment.

The method further comprises executing, 104, the smart client by the consuming component. By executing the smart client, the desired modifications are carried out. For example, the modifications may involve one or more of the following: in the effective network bandwidth, application performance, clock frequency; allowed actions: e.g., access to specific web sites. Therefore, the smart client may be specific for the consumer component and may, in particular, be enabled to establish network connections.

The method further comprises requesting, 106, services by the consuming component (e.g. from the serving component). This relates to the normal operation between the consuming component and the serving component, but with the limitation implemented by the modifications enforced by the smart client (see above).

The method further comprises receiving, 108, a modification for the smart client of the consuming component. Again, the modification may be received from the serving component and may be a reaction on a change (e.g., in the network situation, the rates of requests, overload from other parties, etc.)

FIG. 2 shows a block diagram of a preferred embodiment of the computer-implemented method 200 for enabling modifying a behavior of a consuming component by a serving component. The consuming component may be a client component and the serving component may be a backend server, such as a cloud server. At least one server and one or more clients may be connected by a network to define again an application architecture. This method only defines the inventive concept if viewed from the server (serving component) only.

The method 200 comprises: upon receiving, 202, a request for a smart client by the serving component, providing, 201 a smart client and transmitting, 203, the smart client, in particular, to the consuming component.

This method further comprises, receiving, 204, service requests comprising procedure calls to be executed by the serving component, and upon detecting, 206, a performance change by the serving component, sending, 208, a modification for the smart client.

FIG. 3 shows a block diagram of an embodiment of an architecture 300 that includes both, the consuming component 302 and the serving component 304. Such system may allow the serving components 304 to alter the behavior of the consuming components 302 which can be described as follows.

The consuming component 302 (or the serving component 304) may establish a network connection to the serving component 304. This connection can provide, in particular, a full duplex communication channel based on protocols such as WebSocket. This allows initiating communications in both directions so that also the serving component 304 may initiate communications—even without receiving a request from the consuming component 302.

In detail, FIG. 3 shows a communication diagram between a consuming component 302 and a serving component 304. As a first step, the WebAssembly module 306 (or any other functionally comparable module) sends a request 308 for a smart client to the serving component 304. Alternatively—e.g., based on a login activity—a websocket-based communication channel 310 is established between the WebAssembly (WASM) module 306 and the serving component. This may also be interpreted as the request 308 for a smart client.

The serving component 304 generates, customizes and/or selects a smart client 311, e.g., based on the source of the request, an authentication and/or an identity of the requestor. Next, the smart client—in particular, the executable code or a configuration/re-configuration—is sent, 314, to the WebAssembly module 306. Then, the WebAssembly module 306 initiates that the smart client 311 is installed or instantiated, 316, thereby becoming the instantiated smart client 318 within the runtime environment as provided by the exemplary WebAssembly module 306.

Now, the smart client 318 is enabled to execute, 320, service logic for RPCs (remote procedure call), like caching or selective caching, rate limiting—i.e., adopting the speed at which requests are sent, e.g., to the serving component 304—and/or other activities, like characteristics of a coherence protocol between the consuming component 302 and the serving component 304. Thereby, all RPCs can be tagged with a smart client instance fingerprint.

Using the established communication channel between the serving component 304 and the consuming component 302—e.g., in situations of an overload of the serving component 304—the serving component 304 can send, 322, a modification to the smart client 318, thereby, changing characteristics of the smart client. This may be performed by a completely new smart client 318 or by changing execution and/or configuration parameters of the existing smart client 318 of the consuming component 302. Exemplary, such modifications may comprise a changed caching strategy, mandatory in different endpoints for the RPCs—in particular, a different serving component 304—a reduced rate of RPCs—a communication bandwidth to/from the serving component 304, and so on. At the same time, once the performance bottlenecks of the serving component 304 have been resolved, modifications sent, 322, by the serving component 304 to the consuming component 302 can be undone.

It should also be noted that the smart client 318 should be run in a sandbox environment 324 in order to prevent that the smart client 318 may have any negative, uncontrolled impact on the consuming component 302.

There are various characteristics in the behavior of the smart client 318 on the consuming components 302 that can be changed. Some of them are summarized in the following:

For example, embodiments allow a new defense strategy against distributed denial of service, DDoS, attacks. For this, the serving component 304 can instruct the consuming component 302 to block traffic from specific block listed third parties, while allowing traffic from the consuming components 302 for all other third-party requests. For example, an IAM PEP (policy enforcement point) can be enabled to block requests from a third party on one or more consuming components 302 that are getting requests form the third party. The consuming component(s) 302 (or a larger number of them) can thus contribute to efficiently defending the DDoS attack, in particular against the associated serving component 304.

Another severe problem relates to a DNS outage. Here, the serving component 304 may update local DNS table(s) on a consuming component 302 with correct IP addresses (e.g., when a network disruption situation occurs).

The serving component 304 may even control a caching behavior within the smart client at the consuming component 302. This control may include a change in the caching strategy (e.g., which data are cached for how long), a cache invalidation, disabling a cache coherence, etc.

The smart client may also be configured to send metrics, i.e., related metric values, to the serving components 304 which may comprise parameter values or information describing the current situation or a problem occurring on the parts of the consuming component 302. This can help the serving component 304 to draw the correct conclusion(s) and to provide appropriate update(s) to the consuming component(s) 302.

The smart client 318 can also provide an efficient tool to implement a load shedding for the serving component 304. For example, the serving component 304 can control the load produced by the consuming component 302 by redirecting requests to other servers or by allowing a larger cache than normal on the consuming component 302 side to avoid multiple requests within a comparably short time period.

When comparing embodiments of this inventive concept with conventional systems/methods, the advantages of embodiments are associated with the particular interaction of the consuming component(s) 302 with the serving component(s) 304 through the smart client 318 which specifically allows a dynamic response on a changing situation, e.g., an overload of the serving component 304.

It is understood, there is no need that the serving component 304 only reacts to a request initially sent by the consuming component 304. Also, the serving component 304 is able to initiate an update of the smart client 318 at any time at the consuming component 302.

FIG. 4 shows a block diagram of an embodiment of the consuming component system 400 for enabling modifying a behavior of a consuming component by a serving component.

The system comprises a processor 402 and a memory 404, communicatively coupled to the processor 402 via an exemplary internal bus system 412. The memory 404 stores program code portions that, when executed, enable the processor 402 to provide the following functions: requesting a smart client through a transmission unit 406, executing the smart client by an execution module 410, requesting services through the transmission unit 406, and receiving a modification for the smart client by a receiving unit 408.

The execution (or compute) module 410 can optionally be part of the processor(s) 402 and may, in particular, be realized within a protected environment such as a sandbox runtime environment. Thereby, the sandbox runtime environment defines an isolated compute module on the consuming component that is able to execute program code received from the serving component. An example for this is a WebAssembly runtime (WASM), but there are also other runtime environments conceivable. The transmission unit 406 and the receiving unit 408 can be realized by a network interface (e.g., for wired or wireless communications) that may be utilized for the communication or data exchange to and from the consuming component 300.

In this setup, the smart client system 400 is adapted to modify a control logic of the consuming component. This can change the behavior of the consuming component within its environment. The behavior change comprises, e.g., changes in a usage of available recourses such as network recourses or cache memory recourses, or others.

FIG. 5 shows a block diagram of an embodiment of the serving component system 500 for enabling modifying a behavior of a consuming component by the serving component system 500. The server component system 500 comprises a processor 502 and a memory 504, communicatively coupled to the processor 502 via an exemplary internal bus system 510. The memory 504 is configured to store program code portions that, when executed, enable the processor 502: to provide a smart client and/or to transmit the smart client upon receiving a request for a smart client by the serving component or serving component system. The processor is also enabled to receive service requests comprising procedure calls to be executed by the serving component system 500, and, upon detecting a performance change by the serving component, the processor 502 is also enabled to send a modification for the smart client, in particular to the consuming component system.

The transmission unit 506 and the receiving unit 508 can be realized by a network interface (e.g., for wired or wireless communications) that may be utilized for the communication and the data exchange to and from the serving component system.

It shall also be mentioned that all functional units, modules and functional blocks—in particular, the processor(s) 502, the memory 504, the transmission unit(s) 506, the receiving unit 508—may be communicatively coupled to each other for signal or message exchange in a selected 1:1 manner. Alternatively, the functional units, modules and functional blocks can be linked to a system internal bus system 510 or any other network recourses for a selective signal or message exchange.

The methods described with FIG. 1 and FIG. 2 can be implemented within standalone hardware devices, as shown in FIG. 4 and FIG. 5 (e.g., the consuming component system 400 and/or the serving component system 500), but may also be realized together in one system.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the consuming component system 400 for enabling modifying a behavior of a consuming component by a serving component may be attached to the bus system 606. Similarly, the serving component system 500 for enabling modifying a behavior of a consuming component system 400 may be attached to the bus system 606.

FIG. 7 shows a cloud computing environment 700 in which at least parts of the inventive concept may be deployed. A set of functional abstraction layers provided by a cloud computing environment is shown. It should be understood in advance that the components, layers, and functions, shown in FIG. 7, are intended to be illustrative only, and embodiments of the invention are not limited thereto. As depicted, the following layers and corresponding functions are provided: Hardware and software layer 702 include hardware and software components. Examples of hardware components include: mainframes 704; servers 706; RISC (Reduced Instruction Set Computer) architecture based servers 708; blade servers 710; storage devices 712; networks 714 and networking components 714. In some embodiments, software components include network application server software 716 and/or database software 718.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730. In one example, management layer 732 may provide the functions described below. Resource provisioning 734 provides dynamic procurement of computing resources and other resources that are utilized to perform tasks within the cloud computing environment. Metering and pricing 736 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 738 provides access to the cloud computing environment for consumers and system administrators. Service level management 740 provides cloud computing resource allocation and management such that required service levels are met. Service Level Agreement (SLA) planning and fulfillment 742 provides pre-arrangement for, and procurement of, cloud computing resources for which a future requirement is anticipated in accordance with an SLA.

Workload layer 744 provides examples of functionality for which the cloud computing environment may be utilized. Examples of workloads and functions which may be provided from this layer include: mapping and navigation 746; software development and lifecycle management 748; virtual classroom education delivery 750; data analytics processing 752; transaction processing 754; and other endpoint services, like the consuming component for enabling modifying a behavior of a consuming component by a serving component (compare FIG. 3, 302) or the serving component for enabling modifying a behavior of a consuming component system (compare also FIG. 3, 304).

FIG. 8 shows components 800 of a cloud computing environment 802. As shown, cloud computing environment 802 comprises one or more cloud computing nodes 804 with which local computing devices used by cloud consumers, such as, for example, personal digital assistant (PDA) or cellular telephone 806, desktop computer 808, laptop computer 810, and/or automobile computer system 812 may communicate. Nodes 804 may communicate with one another. They may be grouped (not shown) physically or virtually, in one or more networks, such as Private, Community, Public, or Hybrid clouds as described hereinabove, or a combination thereof. This allows cloud computing environment 802 to offer infrastructure, platforms and/or software as services for which a cloud consumer does not need to maintain resources on a local computing device. It is understood that the types of computing devices 804 shown in FIG. 8 are intended to be illustrative only and that computing nodes 10 and cloud computing environment 802 can communicate with any type of computerized device over any type of network and/or network addressable connection (e.g., using a web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the invention can be summarized by the following clauses:
1. A computer-implemented method for enabling modifying a behavior of a consuming component by a serving component, the method comprising:
   requesting a smart client by a consuming component, wherein the smart client is adapted to modify a control logic of the consuming component, wherein the smart client is enabled to establish a network connection,
   executing the smart client by the consuming component,
   requesting services by the consuming component and receiving a modification for the smart client of the consuming component.
2. The method according to clause 1, wherein the modification for the smart client enables at least one activity selected out of the group comprises: controlling application performance of the consuming component, controlling a connection bandwidth of the consuming component, controlling a cache invalidation of the consuming component, enforcing a selective or a non-selective caching of the consuming component, enforcing a connection request rate limitation of the consuming component, disabling a cache coherence of the consuming component, implementing a preselected coherence protocol for the consuming component, enabling a defense against a distributed denial of service, and reducing a rate for sending requests from the consuming component, updating a name service table of the consuming component.
3. The method according to clause 1 or 2, also comprising tagging a procedure call of the consuming component, controlled by the smart client, by a smart client fingerprint.
4. The method according to any of the preceding clauses, also comprising executing the smart client in a sandbox runtime environment of the consuming component.
5. The method according to any of the preceding clauses, also comprising sending, by the smart client, operational parameter values of the consuming component.
6. The method according to any of the preceding clauses, also comprising validating, by the consuming component, the received smart client or the received modification to ensure authenticity.
7. A computer-implemented method for enabling modifying a behavior of a consuming component by a serving component, the method comprising
   upon receiving a request for a smart client by the serving component, providing a smart client, transmitting the smart client, receiving service requests comprising procedure calls to be executed by the serving component, and
   upon detecting a performance change by the serving component, sending a modification for the smart client.
8. The method according to clause 7, wherein a characteristic of the provided smart client depends on a type of the request for the smart client, a source identifier of the request, an authentication of the request, and/or an identity of the request.
9. The method according to clause 7 or 8, wherein the modification for the smart client enables at least one selected out of the group comprising:
   controlling an application performance, controlling a connection bandwidth, controlling a cache invalidation, enforcing a selective or a non-selective caching, enforcing a connection request rate limitation, disabling a cache coherence, implementing a preselected coherence protocol, enabling a defense against a distributed denial of service, xxx, reducing a rate for sending requests, updating a name service table.
10. The method according to any of the clauses 7 to 9, also comprising upon receiving an operational parameter value indicative of a network performance and/or a load status of the serving component, adapting the modification of the updated smart client before sending it.

11. The method according to any of the clauses 7 to 10, wherein providing the smart client comprises at least one selected out of the group comprising generating the customized smart client, modifying the customized smart client, selecting the customized smart client from a group of smart clients.

12. The method according to any of the clauses 7 to 11, also comprising upon detecting a temporary network fault or a network deterioration, providing the update for the smart client.

13. The method according to any of the clauses 7 to 12, also comprising predicting a service request, and proactively inserting cached data into a consuming application during times of lower than average service request volumes received.

14. A consuming component system for enabling modifying a behavior of a consuming component by a serving component, the consuming component system comprising a processor and a memory, communicatively coupled to the processor, wherein the memory stores program code portions that, when executed, enable the processor, to:

request a smart client by a consuming component, wherein the smart client is adapted to modify a control logic of the consuming component, wherein the smart client is enabled to establish a network connection, execute the smart client by the consuming component, request services by the consuming component, and receive a modification for the smart client of the consuming component.

15. The consuming component system according to clause 14, wherein the modification for the smart client enables at least one activity selected out of the group comprising:

controlling application performance of the consuming component, controlling a connection bandwidth of the consuming component, controlling a cache invalidation of the consuming component, enforcing a selective or a non-selective caching of the consuming component, enforcing a connection request rate limitation of the consuming component, disabling a cache coherence of the consuming component, implementing a preselected coherence protocol for the consuming component, enabling a defense against a distributed denial of service, reducing a rate for sending requests from the consuming component, and updating a name service table of the consuming component.

16. The consuming component system according to clause 14 or 15, wherein the processor is also enabled to tag a procedure call of the consuming component, controlled by the smart client, by a smart client fingerprint.

17. The consuming component system according to any of the clauses 14 to 16, wherein the processor is also enabled to execute the smart client in a sandbox runtime environment of the consuming component.

18. The consuming component system according to any of the clauses 14 to 17, wherein the processor is also enabled to send, by the smart client, operational parameter values of the consuming component.

19. A serving component system for enabling modifying a behavior of a consuming component by a serving component, the server component system comprising:

a processor and a memory, communicatively coupled to the processor, wherein the memory stores program code portions that, when executed, enable the processor, to:

upon receiving a request for a smart client by the serving component, provide a smart client, and transmit the smart client, receive service requests comprising procedure calls to be executed by the serving component, and upon detecting a performance change by the serving component, send a modification for the smart client.

20. The serving component system according to clause 19, wherein a characteristic of the provided smart client depends on a type of the request for the smart client, a source identifier of the request, an authentication of the request, and/or an identity of the request.

21. The serving component system according to clause 19 or 20, wherein the modification for the smart client enables at least one selected out of the group comprising:

controlling an application performance, controlling a connection bandwidth, controlling a cache invalidation, enforcing a selective or a non-selective caching, enforcing a connection request rate limitation, disabling a cache coherence, implementing a preselected coherence protocol, enabling a defense against a distributed denial of service, reducing a rate for sending requests, and updating a name service table.

22. The serving component system according to any of the clauses 19 to 21, wherein the processor is also enabled to:

upon receiving an operational parameter value indicative of a network performance and/or a load status of the serving component, adapt the modification of the updated smart client before sending it.

23. The serving component system according to any of the clauses 19 to 22, wherein the processor, during providing the smart client, is also enabled to generate the customized smart client, modify the customized smart client, and/or select the customized smart client from a group of smart clients.

24. A computer program product for enabling modifying a behavior of a consuming component by a serving component, the computer program product comprising a computer readable storage medium having program instructions embodied therewith, the program instructions being executable by one or more computing systems or controllers to cause the one or more computing systems to:

request a smart client by a consuming component, wherein the smart client is adapted to modify a control logic of the consuming component, wherein the smart client is enabled to establish a network connection, execute the smart client by the consuming component, request services by the consuming component, and receive a modification for the smart client of the consuming component.

25. A computer program product for enabling modifying a behavior of a consuming component by a serving component, the computer program product comprising a computer readable storage medium having program instructions embodied therewith, the program instructions being executable by one or more computing systems or controllers to cause the one or more computing systems to:

upon receiving a request for a smart client by the serving component, provide a smart client, and transmit the smart client, receive service requests comprising procedure calls to be executed by the serving component, and upon detecting a performance change by the serving component, send a modification for the smart client.

What is claimed is:

1. A computer-implemented method for enabling modifying a behavior of a client device by a server in a client-server architecture, the method comprising:
   transmitting, by a server, a smart client to the client device in response to receiving a request for the smart client from the client device, wherein the smart client enables the server to control certain behaviors of the client device that affect server performance;
   sending, by the server, a first modification for the smart client in response to a change in the server performance, wherein the first modification for the smart client results in a modification in a behavior of the client device that reduces a server load associated with the client device; and
   sending, by the server, a second modification for the smart client in response to a reduction in the server load associated with the client device, wherein the second modification for the smart client device reverses the modification in the behavior of the client device that reduced the server load associated with the client device.

2. The computer-implemented method according to claim 1, wherein a characteristic of the provided smart client depends on a type of the request for the smart client, a source identifier of the request, an authentication of the request, and/or an identity of the request.

3. The computer-implemented method according to claim 1, wherein the modification for the smart client enables at least one selected out of the group comprising:
   controlling an application performance,
   controlling a connection bandwidth of the client device,
   controlling a cache invalidation of the client device,
   enforcing a selective or a non-selective caching of the client device,
   enforcing a connection request rate limitation of the client device,
   disabling a cache coherence of the client device,
   implementing a preselected coherence protocol for the client device,
   enabling a defense against a distributed denial of service associated with the client device,
   reducing a rate for sending requests from the client device, and
   updating a name service table of the client device.

4. The computer-implemented method according to claim 3, further comprising:
   upon receiving an operational parameter value indicative of a network performance and/or a load status of the serving component, adapting the modification of the updated smart client before sending it.

5. The computer-implemented method according to claim 1, wherein providing the smart client comprises at least one selected out of the group comprising:
   generating the customized smart client,
   modifying the customized smart client, and
   selecting the customized smart client from a group of smart clients.

6. The computer-implemented method according to claim 1, further comprising:
   upon detecting a temporary network fault or a network deterioration, providing the update for the smart client.

7. The computer-implemented method according to claim 1, further comprising:
   predicting a service request, and
   proactively inserting cached data into a consuming application during times of lower than average service request volumes received.

8. A serving component system for enabling modifying a behavior of a consuming component by a serving component, the server component system comprising:
   a processor and a memory, communicatively coupled to the processor, wherein the memory stores program code portions that, when executed, enable the processor, to:
   transmit, by a server, a smart client to the client device in response to receiving a request for the smart client from the client device, wherein the smart client enables the server to control certain behaviors of the client device that affect server performance;
   send, by the server, a first modification for the smart client in response to a change in the server performance, wherein the first modification for the smart client results in a modification in a behavior of the client device that reduces a server load associated with the client device; and
   send, by the server, a second modification for the smart client in response to a reduction in the server load associated with the client device, wherein the second modification for the smart client device reverses the modification in the behavior of the client device that reduced the server load associated with the client device.

9. The serving component system according to claim 8, wherein a characteristic of the provided smart client depends on a type of the request for the smart client, a source identifier of the request, an authentication of the request, and/or an identity of the request.

10. The serving component system according to claim 8, wherein the modification for the smart client enables at least one selected out of the group comprising:
    controlling an application performance,
    controlling a connection bandwidth,
    controlling a cache invalidation,
    enforcing a selective or a non-selective caching,
    enforcing a connection request rate limitation,
    disabling a cache coherence,
    implementing a preselected coherence protocol,
    enabling a defense against a distributed denial of service,
    reducing a rate for sending requests, and
    updating a name service table.

11. The serving component system according to claim 10, wherein the processor is also enabled to:
    upon receiving an operational parameter value indicative of a network performance and/or a load status of the serving component, adapt the modification of the updated smart client before sending it.

12. The serving component system according to claim 8, wherein the processor, during providing the smart client, is also enabled to
    generate the customized smart client;
    modify the customized smart client; and select the customized smart client from a group of smart clients.

13. A computer program product for enabling modifying a behavior of a consuming component by a serving component, the computer program product comprising a computer readable storage medium having program instructions embodied therewith, the program instructions being executable by one or more computing systems or controllers to cause the one or more computing systems to:

transmit, by a server, a smart client to the client device in response to receiving a request for the smart client from the client device, wherein the smart client enables the server to control certain behaviors of the client device that affect server performance;

send, by the server, a first modification for the smart client in response to a change in the server performance, wherein the first modification for the smart client results in a modification in a behavior of the client device that reduces a server load associated with the client device; and send, by the server, a second modification for the smart client in response to a reduction in the server load associated with the client device, wherein the second modification for the smart client device reverses the modification in the behavior of the client device that reduced the server load associated with the client device.

* * * * *